United States Patent
Pluess et al.

(10) Patent No.: US 9,770,784 B2
(45) Date of Patent: Sep. 26, 2017

(54) LASER MACHINING DEVICE AND METHOD FOR MACHINING A WORKPIECE BY USING A LASER MACHINING DEVICE

(71) Applicant: EWAG AG, Etziken (CH)

(72) Inventors: Christoph Pluess, Burgdorf (CH); Claus Dold, Zuerich (CH); Gregory Eberle, Dietikon (CH)

(73) Assignee: EWAG AG, Etziken (CH)

( * ) Notice: Subject to any disclaimer, the term of this patent is extended or adjusted under 35 U.S.C. 154(b) by 203 days.

(21) Appl. No.: 14/728,024

(22) Filed: Jun. 2, 2015

(65) Prior Publication Data

US 2015/0258632 A1    Sep. 17, 2015

Related U.S. Application Data

(63) Continuation-in-part of application No. PCT/EP2013/075414, filed on Dec. 3, 2013.

(30) Foreign Application Priority Data

Dec. 4, 2012 (DE) .................. 10 2012 111 771

(51) Int. Cl.
*B23K 26/08* (2014.01)
*B23K 26/04* (2014.01)
(Continued)

(52) U.S. Cl.
CPC ............ *B23K 26/38* (2013.01); *B23K 26/044* (2015.10); *B23K 26/0622* (2015.10);
(Continued)

(58) Field of Classification Search
CPC .. B23K 26/0807; B23K 26/083; B23K 26/38; B23K 26/045
(Continued)

(56) References Cited

U.S. PATENT DOCUMENTS 3,931,458 A    1/1976 Dini
8,491,577 B2 *  7/2013 Kittelmann ............ A61F 9/008
                                                  606/5
(Continued)

FOREIGN PATENT DOCUMENTS

CN    1596172 A    3/2005
CN    101035645 A  9/2007
(Continued)

OTHER PUBLICATIONS

English Translation of the Chinese Office Action and Search Report dated Jun. 3, 2016, for a Chinese patent application 201380063252.2 that corresponds to the same international patent application as the present application (13 pages).

(Continued)

*Primary Examiner* — Samuel M Heinrich
(74) *Attorney, Agent, or Firm* — R. S. Lombard; K. Bach

(57) ABSTRACT

The invention relates to a method and a laser machining device 10 for machining a workpiece 13. The laser machining device 10 has a laser 11 for generating a laser beam 12, which is deflected by way of a deflecting device 15 in accordance with a pattern defined by a control unit 14 and is directed onto a workpiece surface 17 of a workpiece 13, which surface is to be machined. The point of impingement 18 of the deflected laser beam 12b on the workpiece surface 17 is guided along at least one spiral path within a circular hatched area 16. The spiral path 19 is characterized by spiral path parameters. One spiral path parameter is the line spacing a between neighboring points of intersection P of the spiral path 19 with an axis running through the center point M of the spiral path 19.

15 Claims, 6 Drawing Sheets

(51) Int. Cl.
  *B23K 26/38* (2014.01)
  *B23K 26/36* (2014.01)
  *B23K 31/02* (2006.01)
  *B23K 26/082* (2014.01)
  *B23K 26/044* (2014.01)
  *B23K 26/0622* (2014.01)
  *B23K 101/20* (2006.01)

(52) U.S. Cl.
  CPC .......... *B23K 26/082* (2015.10); *B23K 26/083* (2013.01); *B23K 26/0823* (2013.01); *B23K 26/36* (2013.01); *B23K 31/025* (2013.01); *B23K 2201/20* (2013.01)

(58) Field of Classification Search
  USPC ............ 219/121.68, 121.69, 121.61, 121.62, 219/121.83, 121.78, 121.79
  See application file for complete search history.

(56) References Cited

U.S. PATENT DOCUMENTS

| | | |
|---|---|---|
| 2003/0103107 A1 | 6/2003 | Cheng et al. |
| 2011/0095005 A1 | 4/2011 | Brunner et al. |
| 2013/0154159 A1 | 6/2013 | Noel et al. |

FOREIGN PATENT DOCUMENTS

| | | |
|---|---|---|
| CN | 102091875 A | 6/2011 |
| CN | 102728957 A | 10/2012 |
| WO | WO 2010095826 A2 | 8/2010 |

OTHER PUBLICATIONS

Chinese Office Action and Search Report for Chinese patent application 20130063252.2 in Chinese (8 pages).
Partial English Machine Translation (by GOOGLE) of the above-referenced WO 2010095826 A2.

\* cited by examiner

LASER MACHINING DEVICE AND METHOD FOR MACHINING A WORKPIECE BY USING A LASER MACHINING DEVICE

CROSS-REFERENCE TO RELATED APPLICATIONS

This is a continuation-in-part application of pending international application PCT/EP2013/075414 filed Dec. 3, 2013, and claiming the priority of German application No. 10 2012 111 771.3 filed Dec. 4, 2012. The said International application PCT/EP2013/075414 and German application No. 10 2012 111 771.3 are both incorporated herein by reference in their entireties as though fully set forth.

BACKGROUND OF THE INVENTION

The invention relates to a method as well as to a laser machining device for machining a workpiece with the use of a laser machining device for machining said workpiece by means of a laser beam.

The method in accordance with the invention and the laser machining device in accordance with the invention are disposed for the ablation of metal from a workpiece, in particular so as to produce a cutting edge, a cut surface and/or a flank surface on the workpiece and produce a cutting tool.

Such a method and a laser machining devices have been known from publication DE 10 2009 044 316 A1, for example. The laser beam pulses are directed within a pulse or hatched area at the workpiece surface and impinge on the workpiece there. At the point of impingement of the laser beam pulse, material is ablated from the workpiece. Due to the relative movement between the workpiece and the hatched area, the material ablation is performed on the workpiece consistent with this movement. In doing so, the hatched area moves in a manner similar to a milling cutter or another cutting tool relative to the workpiece.

This method has proven to be highly successful. The object of the present invention is to improve the known method and the known device, respectively, in order to improve the quality of the workpiece that is to be machined or the produced product, for example a cutting tool.

SUMMARY OF THE INVENTION

This object is achieved in accordance with a method exhibiting the features of Claim 1 and with a laser machining device exhibiting the features of Claim 15.

In accordance with the invention a laser beam is generated with the use of a laser. Preferably, it is a pulsed laser so that the laser beam is formed by laser beam pulses. Provided in the optical path of the laser beam, there is a deflecting device that can be activated by a control unit. The laser light emitted by the laser and impinging in the deflecting device is deflected into at least two spatial directions while the workpiece is being machined and directed on the workpiece surface within a hatched area having a prespecified contour. Within the hatched area, the deflecting device moves the point of impingement of the deflected laser beam along at least one prespecified spiral path. The radius of the spiral path from the center point to an outer path end point corresponds approximately to the radius of the hatched area. During the machining operation, this hatched area and the workpiece are positioned and oriented relative to each other with the aid of a positioning assembly and, in particular, also moved relative with respect to each other. Preferably, the positioning assembly has several machine axes in the form of rotating axes and/or linear axes for moving and/or positioning the workpiece and the deflecting device relative with respect to each other.

Depending on the machining task and/or the material of the workpiece and/or the set laser power and/or the pulse duration or pulse frequency of the laser and/or additional marginal conditions affecting the machining operation, the energy input of the laser within the hatched area is set, in accordance with the invention, by selecting or setting at least one spiral path parameter that describes the course of the spiral path from the center point to the outer path end point. At least the line spacing of the spiral path may act as a spiral path parameter. The line spacing of the spiral path is understood to mean the space between two directly adjacent points of intersection of the spiral pith with a straight line or axis extending through the center point of said spiral path. In other words: the distance between the individual spiral convolutions of the spiral path starting from the center point of the spiral path, viewed in radial direction, is referred to as line spacing. Preferably, the line spacing is irregular and may be set, for example, so as to be—starting from the center point of the spiral path—continuously increasing radially toward the outside or continuously decreasing.

Consistent with the line spacing, the distribution of the energy input of the laser beam within the hatched area is prespecified. For example, the energy input in the marginal region of the hatched area and/or in the center of the hatched area is greater than at other points of the hatched area. Consequently, a suitable ablation profile for the ablation of material can be set via the line spacing, said ablation profile being produced in the course of the relative movement between the hatched area and the workpiece. As a result of this, the line spacing can be used for setting and adapting the ablation profile for the machining task at hand.

While the workpiece is being machined, the hatched area is moved along the workpiece surface and, in doing so, a material ablation is achieved, said ablation having the form of a groove when the hatched area fully impacts on the workpiece on a workpiece surface and does not only partially overlap with the workpiece surface. In doing so, an ablation profile is created that corresponds to the cross-sectional profile of the produced groove, as it were. Via the line spacing and, optionally, via additional spiral path parameters, it is possible to influence the ablation profile and to adapt the machining task. In the event of decreasing line spacing—viewed in radial direction from the center point of the spiral path toward the outside—it is possible to produce steeper groove flanks or abrasion profile flanks. For example, this is advantageous during the smoothing operation in order to achieve a lower surface roughness on the flank of the ablation profile. For finish-machining the workpiece, only a low material ablation rate is necessary, so that the energy for laser ablation introduced in the center of the hatched area can be reduced relative to the higher energy input in the marginal region of the hatched area. As a result of this, it is possible to also achieve small cutting edge radii with such a setting.

Conversely, setting the line spacing can ensure that the flank steepness of the ablation profile is reduced and, instead, a greater portion of the total laser energy is input in the hatched area in the center of the hatched area, so that, at the groove bottom or at the bottom of the ablation profile, a sufficiently high and the most uniform possible material ablation is achieved. Such a setting is suitable for achieving high material ablation rates when roughing down the workpiece.

It has been found that the movement of the point of impingement of the laser within the hatched area along a spiral path provides enormous advantages compared with other path forms. It must be possible to set the energy input highly accurately when great manufacturing precision is to be achieved. Also, sufficiently high material ablation rates are to be achieved. By generating a hatched area with a laser impingement point of the laser beam on the workpiece, said laser being moved along a spiral path, it is possible to achieve very high material ablation rates. The movement of the point of impingement of the laser beam generated by the deflecting device within the hatched area may be, for example, 2000 millimeters per second and is, in particular, faster by approximately one to two orders of magnitude than the relative movement of the workpiece with respect to the deflecting device of the hatched area that can be approximately 20 to 120 millimeters per minute. By setting the line spacing of the spiral path, it is possible to achieve a highly accurate and differentiated setting of the energy distribution of the energy input by the laser beam within the hatched area and thus the material ablation within the hatched area. The rapid movement of the laser beam by means of the deflecting device along an arcuate path can be attained while avoiding too great a load on the setting means, in particular the servomotors of the deflecting device, even in the case of extended operating times of the laser machining device.

It is advantageous if—as a spiral parameter describing the at least one spiral path—in addition to the line spacing, one or more of the following spiral path parameters can be set or selected from prespecified data for influencing the material ablation:

The radius of at least one spiral path between the center point of the spiral path and one outer path end point;

The number of spiral convolutions of the at least one spiral path within the hatched area.

The radius of the at least one spiral path corresponds approximately to the radius of the circular hatched area and determines the width of the resultant ablation profile. On account of the number of spiral convolutions it is possible to prespecify the total energy input in the hatched area. The total energy input in the hatched area can be varied or adapted to the machining task via the line spacing.

The line spacing is affected, in particular, by a prespecified spacing function. The spacing function comprises at least one variable spacing parameter. This spacing parameter can be set or selected from prespecified values. Preferably, the spacing function comprises a term at which the spacing parameter is in the exponent of the function variable. In doing so, the function variable indicates the actual spacing at the viewed point of the spiral path from the center point of the spiral path.

It is advantageous if—within the hatched area—there are at least one first spiral path and at least one additional, second spiral path that is different from the first spiral path. The point of impingement of the laser then is deflected sequentially through several spiral paths within the hatched area. The first spiral path extends from the center point of the spiral path or the hatched area radially outward to a path end point of the first spiral path. At this path end point of the first spiral path, the associate second spiral path adjoins directly and extends from there to the common center point of the two spiral paths. In this manner, the point of impingement of the laser beam can occur—without directional change and without corners and bends in the path of movement—from the center outward and back again. As a result of this, a particularly gentle operation for the setting means or servomotors of the deflecting device can be achieved. Sudden movements with high accelerations or acceleration changes in the servomotors of the deflecting device can be particularly well avoided as a result of this.

The second spiral path may have the same spiral path parameters as the first spiral path. For example, the second spiral path can be achieved by mirroring the first spiral path. The axis at which the first spiral path is mirrored to produce the second spiral path extends through the center point of the first spiral path, as well as the path end point of the first spiral path. Respectively one first and one second spiral path form a spiral path pair.

Additionally, it is possible to achieve further spiral path pairs of respectively one first and one associate second spiral path by rotation of a starting pair of a first and a second spiral path. The several spiral path pairs of respectively one first and one second spiral path are uniformly distributed, in particular, in circumferential direction around the center point of the hatched area within the hatched area. As a result of such a predetermination for the deflection of the laser beam, it is possible not only to achieve a gentle continuous operation of the laser machining device but, at the same time, a homogeneous material ablation within the hatched area and, in particular, also in the region of the center point of the hatched area. As a result of this, the ablation profile may have an almost ideal U-shape with steep flanks and sufficiently extensive material ablation in the region of the bottom.

In a preferred embodiment, the at least one spiral path is composed of several semicircular segments having different radii. Preferably, the transition points between the respectively adjoining semicircular segments are located between the respectively adjoining semicircular segments on a common axis through the center point and the path end point of the spiral path. Respectively two semicircular segments represent one spiral convolution. A particularly simple calculation of the spiral path can be achieved in that the semicircular segments located on the same side of the axis by transition points form a group of first semicircular segments that are arranged, respectively, concentrically with respect to the center point of the spiral path. Only the respectively other group of the second semicircular segments has a semicircular center point each, said center point being shifted relative to the center point of the spiral path.

As an alternative to this exemplary embodiment, the spiral path may also be calculated or formed by other mathematical methods, for example by spline interpolation.

Several selectable machining programs for workpiece machining may be stored in the laser machining device. Depending on the machining task, an operator may select a suitable machining program. For example, in that case workpiece materials, desired forms of the ablation profile, cutting edge radii, surface roughnesses or the like can be set or selected. The line spacing and, optionally, additional spiral path parameters are then set as a function of the selected machining program. These spiral path parameters are allocated to the selectable machining program, for example, in a table or consistent with another comparable allocation rule. The machining programs intended for a machining task and the spiral path parameters necessary therefor can be empirically determined and then put in memory.

BRIEF DESCRIPTION OF THE DRAWINGS

Advantageous embodiments of the invention can be inferred from the dependent patent claims as well as from the description. The description is restricted to essential features of the method in accordance with the invention and the laser machining device, respectively. The drawings are to be used for additional reference. Hereinafter, the exemplary embodiments are explained in detail with reference to the drawings. They show in FIG. 1 a schematic block diagram of an exemplary embodiment of a laser machining device;

DETAILED DESCRIPTION OF THE INVENTION

Figure 1:
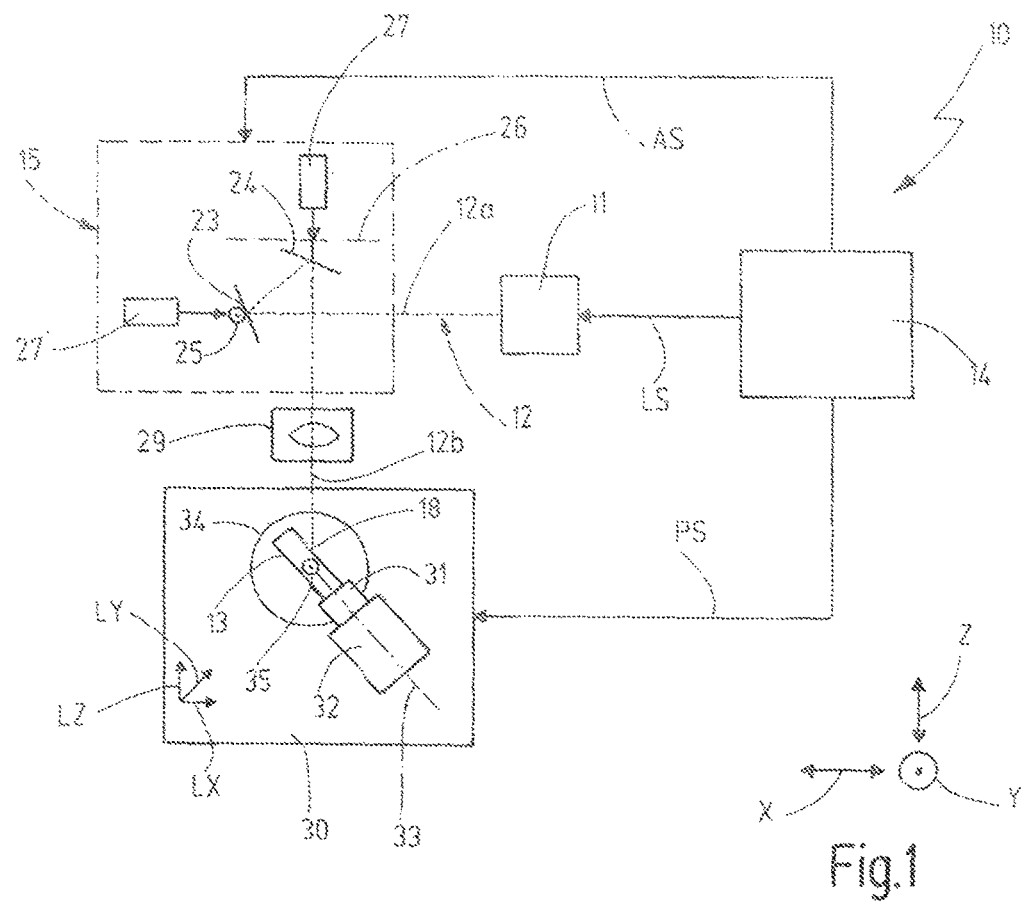

FIG. 1 shows a block diagram of a laser machining device 10. The laser machining device 10 comprises a laser 11 for generating a laser beam 12. The laser beam 12 may be a pulsed laser beam 12. Today, it is already possible to achieve pulse frequencies of up to 30 MHz; however, the pulse frequency may also be higher in the future—depending on further developments. By means of the laser beam 12, a workpiece 13 is machined in that the impinging laser beam pulses ablate material. The material of the workpiece is vaporized at the point of impingement 18 of the laser beam pulse (laser ablation).

A control unit 14 controls the laser 11 with the aid of a laser signal LS. The operating parameters of the laser 11, for example, the pulse duration, the pulse frequency, the laser power or the like can be prespecified by means of the laser signal LS.

The laser machining device 10 comprises a deflecting device 15 in the optical path of the laser beam 12, said deflecting device being activated by the control unit 14. The deflecting device 15 is disposed to deflect the incident laser beam 12a emitted by the laser 11 consistent with the activation of the control unit 14, so that the laser beam 12b emitted by the deflecting device 15 impinges within the hatched area 16 (FIG. 2) on the workpiece surface 17 of the workpiece 12. In doing so, the deviated laser beam 12b is directed to a point of impingement 18 within the hatched area 16. FIG. 3 illustrates schematically only three points of impingement 18. At each point of impingement 18, a crater is produced in the workpiece 13. Neighboring craters or points of impingement 18 may overlap, in which case the percentage of overlapping of the neighboring points of impingement 18 may also—different from FIG. 3—be greater and amount to almost 100%.

The deflecting device 15 is controlled in such a manner that the point of impingement 18 moves within the hatched area 16 along a prespecified spiral path 19 (FIG. 3). The points of impingement 18 of the generated laser beam pulses thus migrate within the hatched area 16 along at least one spiral path 19. In doing so, material is removed from the workpiece 13 in the hatched area 16.

In order to deflect or orient the deflected laser beam 12b along the spiral path 19 within the hatched area 16, the deflecting device 15 comprises at least one and—in the exemplary embodiment described here—at least one first deflecting mirror 23 and one second deflecting mirror 24. The incident laser beam 12a first impinges on the first deflecting mirror 23 and is reflected there to a second deflecting mirror 24, and from the second deflecting mirror 24 directed—in turn—onto the desired point of impingement 18. Thus, the laser beam 12 is oriented in at least two spatial directions via the deflecting device 15 so that the point of impingement 18 can reach any point within the hatched area 16. In the exemplary embodiment, the two deflecting mirrors 23, 24 are supported so as to be pivotable about an associate mirror pivot axis 25, 26 for this purpose. In the exemplary embodiment described here, the first mirror pivot axis 25 of the first deflecting mirror 23 extends at a right angle with respect to the plane of projection in FIG. 1 and, in accordance with the example, in Y-direction. The second mirror pivot axis 26 of the second deflecting mirror 24 is oriented at a right angle with respect to the first mirror pivot axis 25 and, in accordance with the example, extends in an X-direction.

Each of the two deflecting mirrors 23, 24 is associated with an actuator or servomotor 27, with which a respective pivoting movement about the associate mirror pivot axis 25 or 26 can be generated. The servomotors 27 are activated electrically based on a deflecting signal AS of the control unit 14.

In the exemplary embodiment, the laser beam 12b is guided by a focusing device 29 that may comprise one or more optical focusing elements, for example lenses. The laser beam is focused on the point of impingement 18 by means of the focusing unit 29.

Furthermore, the laser machining device 10 comprises a positioning assembly 30. The positioning assembly 30 is disposed to position a workpiece holder 31 of the laser machining device 10 relative to the deflecting device 15 and/or to move said holder during the machining operation, said holder holding the workpiece 13 while it is being machined. For this purpose, the positioning assembly 30 is activated by the control unit 14 by means of a positioning signal PS.

The positioning assembly 30 may comprise several machine axes with linear drives and/or pivot drives. The linear drives LX, LY, LZ are shown in FIG. 1 only greatly schematized by arrows. The number and combination of the linear drives used thereof is variable. In the exemplary embodiment described here, there are five machine axes, where three linear axes each having a linear drive LX, LY, LZ and two pivot axes having a pivot drive each are provided. The workpiece holder 31 can be moved in all three spatial directions X, Y, Z. A first pivot drive 32 is disposed for pivoting or rotating the workpiece 13 about a first pivot axis 33 that extends through the workpiece holder 31. Via a second pivot drive 34, the first pivot drive 32 having the first pivot axis 33 is pivoted about a second pivot axis 35 that, in the exemplary embodiment, extends in X-direction at a right angle with respect to the plane of projection of FIG. 1. The number and combination of machine axes in the exemplary embodiment in accordance with FIG. 1 is only an example and can be varied in any way.

Figure 2:
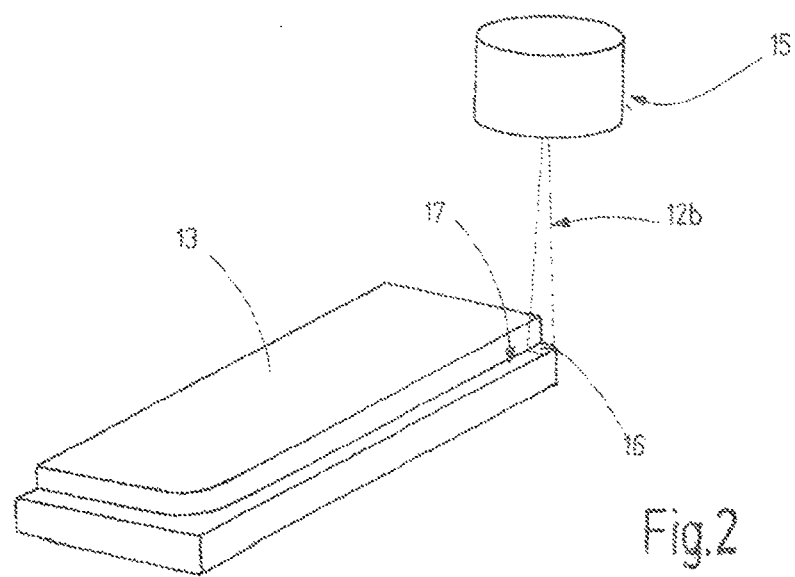
FIG. 2 a schematic perspective representation of the machining of the workpiece and the hatched area being moved along the workpiece for this purpose.
Figure 3:
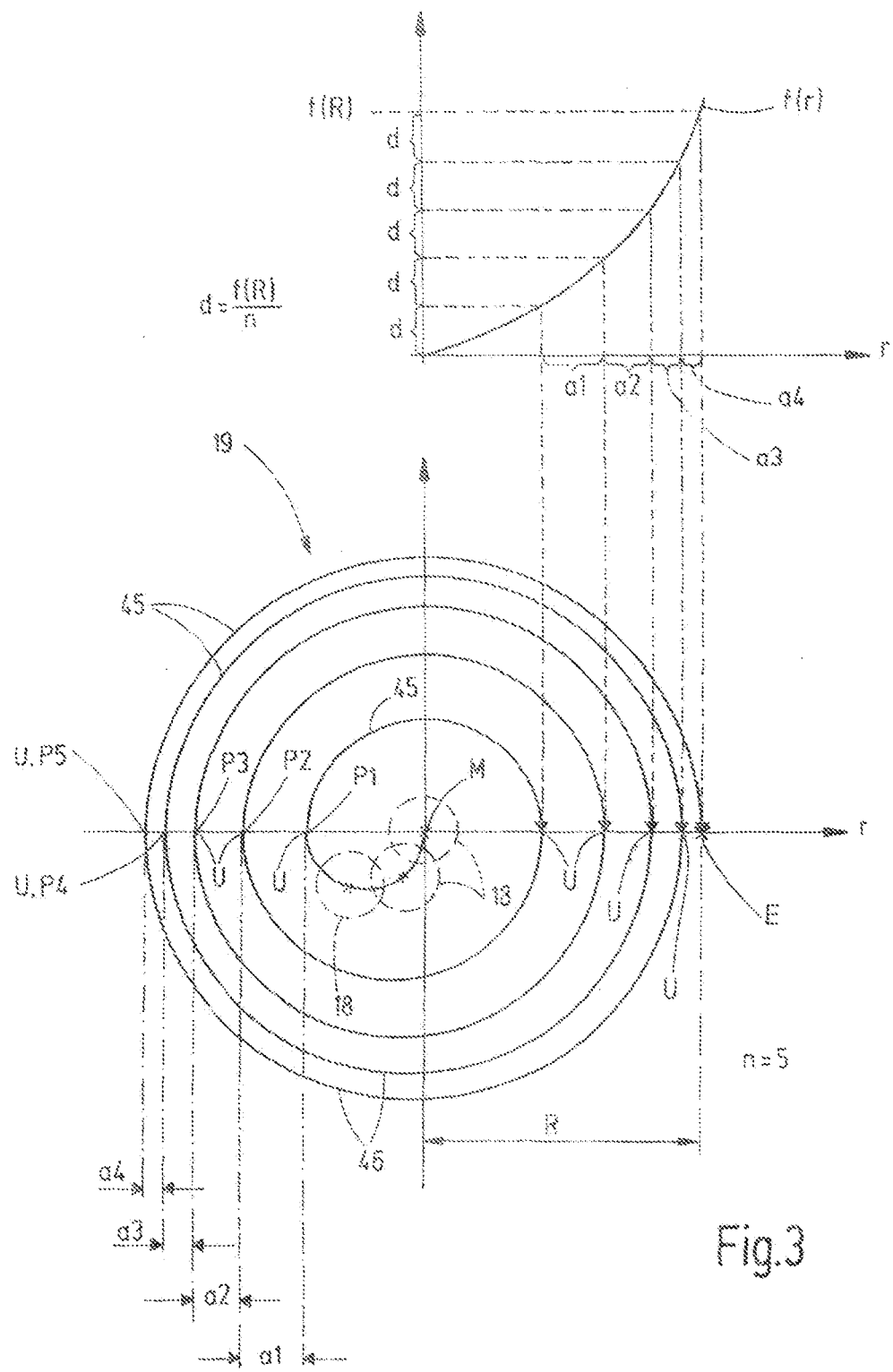
FIG. 3 a schematic representation of an exemplary embodiment of a spiral path and the determination of the line spacing of the spiral path with the aid of a spacing function.

FIG. 2 shows in a highly schematized manner a workpiece 13 having the form of a parallelepiped while it is being machined. By means of the positioning assembly 30, a relative movement between the deflecting device 15 and the workpiece 13 is generated during the machining operation, in which case, as in the example, the workpiece 13 is moved relative to the deflecting device 15 by means of the positioning assembly 30. In doing so, the hatched area 16 migrates along the workpiece surface 17 and performs a material ablation on the workpiece 13 in its respective position. When the hatched area 16 is completely within the workpiece surface 17 of the workpiece 13, a groove-shaped material ablation is achieved, so that the resultant ablation profile 40 has two flanks 41 and one bottom 42 (FIGS. 4 to 7). However, it is also possible to guide the position of the hatched area 16—as shown by FIG. 2—along an edge of the workpiece 13 so that the ablation profile has only one flank 41 and the bottom 42. This is the case when the margin of the hatched area 16 ends at one edge of the workpiece or when the hatched area 16 overlaps the workpiece surface 17 only partially.

In accordance with the invention at least one spiral path parameter that describes the progression or the form of the at least one spiral path 19 within the hatched area 16, that influences the energy input by the laser in the hatched area 16, as well as the distribution of this energy input within the hatched area 16. As a result of this, the desired ablation profiles 40 can be produced that, in turn, affect the properties of the machined workpiece 13 or of the product manufactured therefrom, for example a cutting tool. The following spiral path parameters can be used by themselves or in any combination:

The radius R from a center point M of the spiral path 19 to a radially outer path end point E or the diameter of the spiral path 19 or the hatched area 16;

The number of spiral convolutions (n) starting from the center point M of the spiral path 19 to the path end point E;

The variable line spacing (a) between two neighboring points of intersection P of the spiral path 19 with a straight line extending through the center point M as well as the path end point E or the axis, i.e., the r-axis in the representation of FIG. 3.

Figure 4:
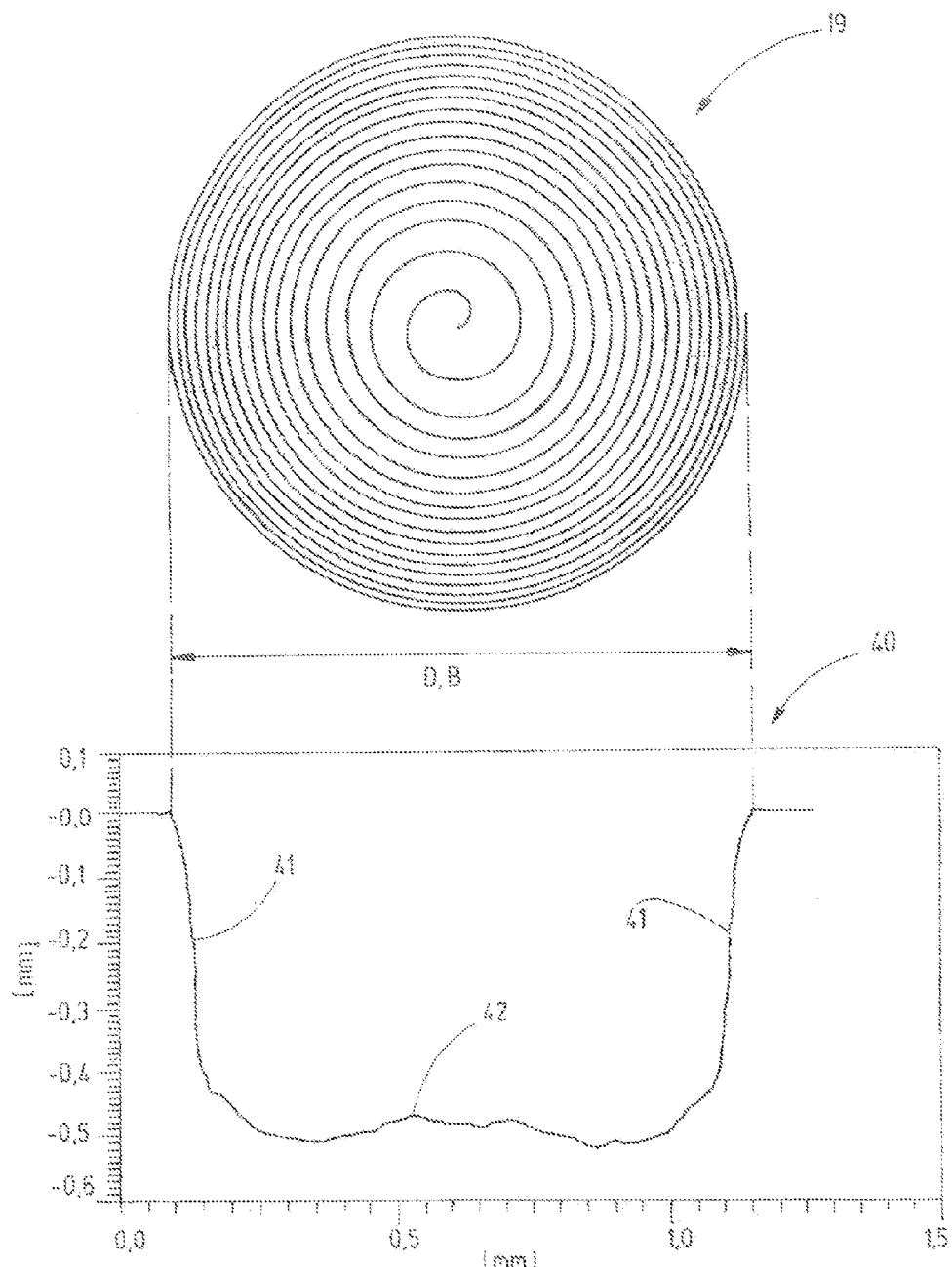
FIG. 4 a further exemplary embodiment of a spiral path and the ablation profile produced by this spiral path.

The maximum width B of the ablation profile is prespecified via the radius R or the diameter of the spiral path 19, as is schematically illustrated in FIG. 4. The total energy input of the laser beam 12 in the hatched area 16 is determined via the number of spiral convolutions n. The distribution of the total energy input within the hatched area 16 is prespecified by the line spacing a. The line spacing a may be constant for the entire spiral path 19. In order to achieve the desired ablation profiles 40, the line spacing a may also be variable extending from the center point M of the spiral path 19 radially toward the outside; for example, it may become continually greater or, in particular, also continually smaller.

Figure 5:
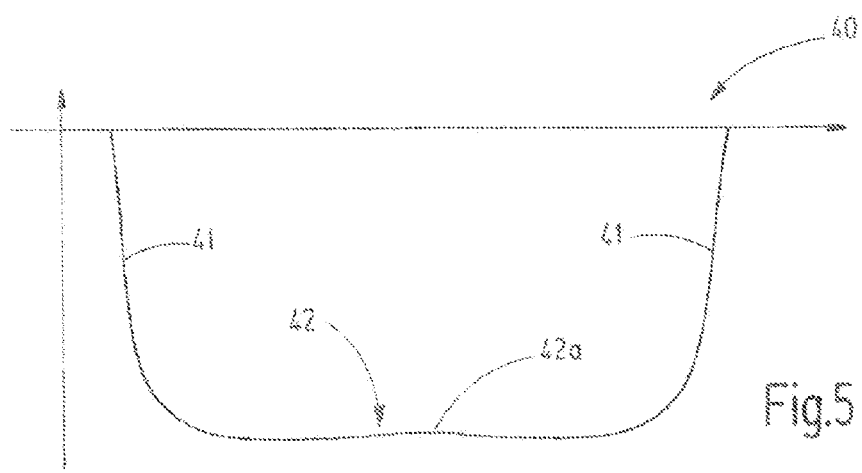
FIGS. 5 to 7 schematic representations of the principle of an ablation profile that can be produced by varying the line spacing of the spiral path and, optionally, other spiral path parameters.
Figure 6:
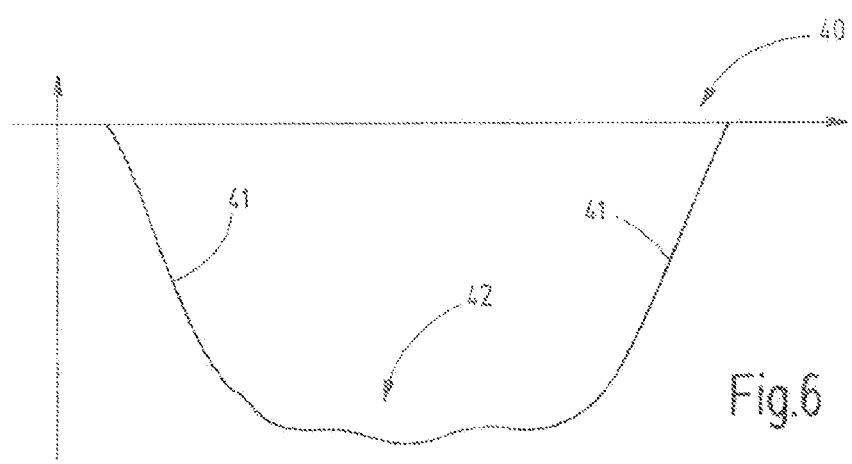
Figure 7:
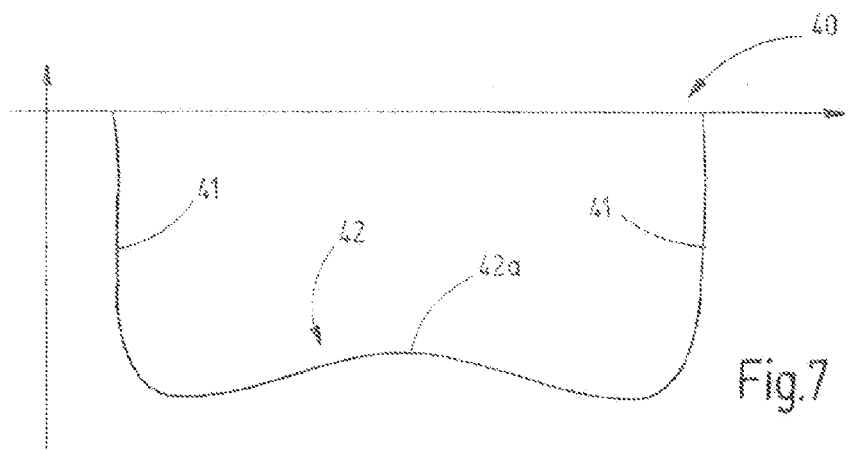

FIGS. 5 to 7 show schematically different basic forms of achievable ablation profiles 40. FIG. 5 shows an ablation profile 40 having a U-shape with relatively steep flanks 41 and a bottom 42, along which the material ablation occurs relatively uniformly. In the region of the center point M of the spiral path 19 or the hatched area 16, a slight elevation 42 may form at the bottom 42 when the energy input in the region of the center point M of the spiral path 19 is lower than radially farther outside. The U-shaped ablation profile 40 in accordance with FIG. 5 may be selected, for example, in order to achieve a high material ablation during a first machining step of the workpiece 13.

FIG. 6 shows an ablation profile 40, in which the two flanks 41 subtend a larger angle between each other than in the case of the ablation profile 40 in accordance with FIG. 5; accordingly, the flank 41 is thus less steep in this case. The ablation profile 40 according to FIG. 6 can thus be referred to as representing a V-profile.

FIG. 7 shows an ablation profile 40 with two flanks 41 that, together, subtend a very small angle and are thus very steep. In order to produce this ablation profile 40 in the marginal region of the hatched area 16 and thus radially on the outside of the spiral path 18, the line spacing (a) is minimal, thus leading to a high energy input there. Due to this energy distribution from the center of the hatched area in radially outward direction, the material ablation in the region of the bottom 42 adjoining the flanks 41 is greater than in the center region of the bottom 42, so that, there, a larger elevation 42a is formed than in the other exemplary embodiments according to FIGS. 5 and 6. The ablation profile may be referred to as a W-profile. Due to the relatively high energy application in the marginal region of the hatched area 16, the W-profile in accordance with FIG. 7 is particularly suitable for producing very small cutting edge radii and for finish-machining the workpiece 13. On the flanks 41 and thus on a cutting area or flank area of the workpiece 13, it is possible to produce surfaces having a very minimal surface roughness that approximately corresponds to a polished surface.

FIG. 3 shows, in a highly schematized manner, the determination of the line spacing a. For example, it shall be assumed that the number n of spiral convolutions is selected as n=5. The determination of the line spacing (a) is the same for other numerical values n. As described, the number n of spiral convolutions is used to determine the energy that will be input in the hatched area 16 to achieve the material ablation when the overlap of neighboring points of impingement 18 and the laser power are given. The overlap of neighboring points of impingement 18 and the laser power, as well as the pulse frequency, change the energy input into the hatched area.

Furthermore, a spacing function f(r) is prespecified. Thus, the spacing function f is a function of the function variable r that, in the present case, indicates the distance of the points of intersection P from the center point M of the spiral path 19. Thus, with the use of the spatial function f, the line density of the spiral path 19 is influenced as a function of the distance of the center point M as follows:

$$f(r) = b * r^c$$

wherein
r: function variable indicating the distance of the viewed point of the spiral path 19 from the center point M,
b: scaling factor,
c: spacing parameter.

The line spacing a is set by way of the spacing parameter c. If the spacing parameter c is greater than 0 and less than 1, the line spacing increases from the center point M of the spiral in radially outward direction. If the spacing parameter c is greater than 1, the line spacing decreases from the center point M of the spiral radially toward the outside, as illustrated for example in FIG. 3. If the spacing parameter c=1, the line spacing a is constant. As a rule, the scaling factor b is b=1, in order to not change the radius R of the hatched area 16.

It is also possible to select other spacing functions f that, for example indicate a logarithmic or exponential dependence of the function value f(r) on the function variable r. It is also possible to prespecify different spacing functions for various sections of the function variable r, said spacing functions preferably exhibiting a steady transition, and/or a transition that can be differentiated, on two section boundaries of the section of the function variable r. It has been found to be advantageous when the spacing functions f comprise a term at which the spacing parameter c is placed in the exponent of the function variable r.

With the use of the spatial function f, the line density (a) is determined as illustrated by FIG. 3. First, the function value f(R) for the radius R of the spiral path 19 is calculated and, subsequently, dependent on the number n of the spiral convolutions, divided into equidistant section d=f(R)/n (FIG. 3). Then, the individual line spacings a1, a2, a3 . . . a(n−1) are determined by means of the reverse function of the spacing function f. The path end point E is also known due to the known radius R of the spiral path 19. Starting from this path end point and using the line spacings a1, a2, a3, . . . a(n−1), the positions of the points of intersection P for each spiral convolution of the spiral path 19 having the r-axis can be calculated.

In accordance with the example, the spiral path 19 is formed by first semicircular segments 45 and second semicircular segments 46. All semicircular segments 45, 46 have different radii. One or two second semicircular segments 46 follow a first semicircular segment 45 at a respective point of transition U. The points of transition U are located on a common axis, i.e., on the r-axis in the exemplary embodiment according to FIG. 3. The group of the first semicircular segments 45 is arranged concentric to the center point M of the spiral path 19. The group of the second semicircular segments 46, respectively, have a center point M of the spiral path 19 that is different from the semicircular center points, wherein also the individual second semicircular segments 46 exhibit different center points of the semicircle. Due to this design, the spiral path 19 can be calculated very easily and rapidly.

Starting from the above-described determined outer point of intersection P (here: point of intersection P5) or the path end point E, the known radius R is used for positioning the outermost first semicircular segment 45 concentric to the center point M. The second semicircular segment 46 following the latter has the line spacing a(n−1), here a4, from the path end point E. Based on this, the semicircular center of this second semicircular segment 46 can be determined, as a result of which the outermost spiral convolution of the spiral path 19 is obtained. The subsequent additional spiral path convolutions are determined analogously thereto, until the spiral path 19 has reached its center point M.

Figure 11:
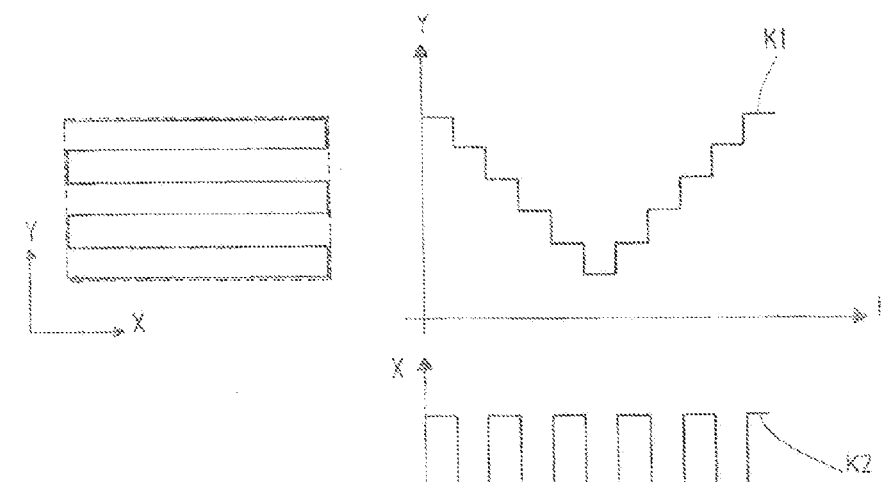
FIG. 11 a representation of the principle of the activation the servomotors of a deflecting device with a meandering path progression of the point of impingement of the laser beam within the hatched area.
Figure 12:
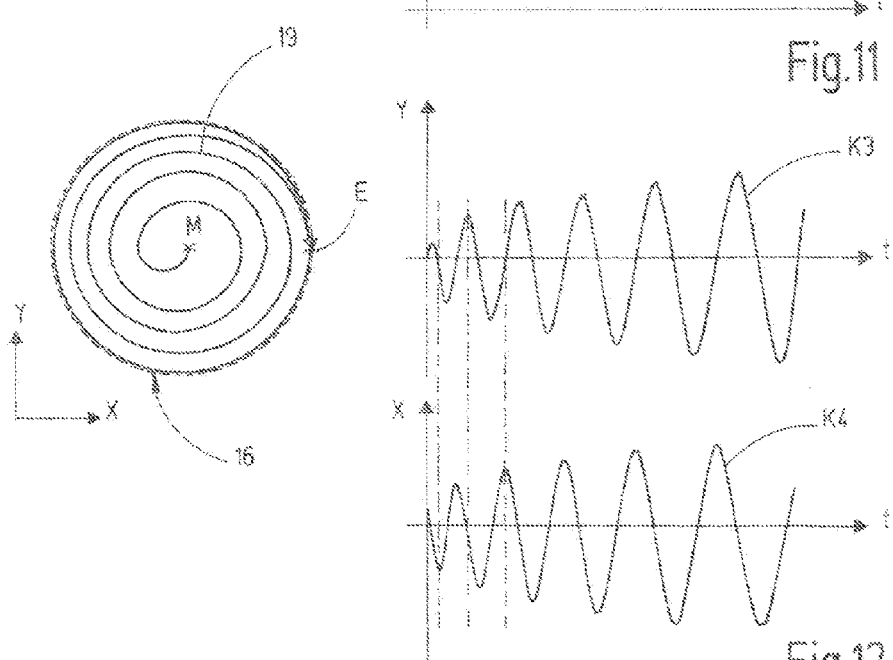
FIG. 12 a schematic representation of the activation of the servomotors of the deflecting device while guiding the point of impingement of the laser beam on the workpiece surface along a spiral path within the hatched area.

In contrast with other path progressions, guiding the point of impingement 18 and thus the deflected laser beam 12b along the spiral path 19 within the hatched area 16 has advantages in view of the operation of the deflecting device 15 with servomotors 27 for the deflecting mirrors 23, 24. FIG. 11 shows schematically a meandering path as an example for guiding the point of impingement 18 of the laser beam 12 on the workpiece surface. In such or comparable paths of movement of the point of impingement 18 of the deflected laser beam 12b, the deflecting mirrors as shown in FIG. 11 are accelerated and stopped time and again in order to attain the desired movement pattern. In doing so, the first curve K1 represents the activation of a deflecting mirror and the second curve K2 represents the activation of the respectively other deflecting mirror as a function of time t. In doing so, as is obvious from FIG. 11, the position of the deflecting mirror is changed intermittently or incrementally in X-direction as well as in Y-direction. Thus high accelerations and acceleration changes occur. In doing so, the servomotors 27 for the deflecting mirrors are greatly stressed.

In contrast, in accordance with the invention, a spiral path 19 is provided for the movement of the point of impingement 18 of the laser beam 12 on the workpiece surface 17. The spiral path 19 can be attained by sinusoidal and cosinusoidal displacement movements of the two deflecting mirrors 23, 24, as is schematically illustrated by the third curve K3 and the fourth curve K4. The two curves K3, K4 are phase-shifted relative to each other. In accordance with the example, the fourth curve K4 for the activation of the servomotor 27 for the first deflecting mirror 23 is cosinusoidal, while the third curve K3 for the activation of the servomotor 27 for the second deflecting mirror 24 is sinusoidal. In this case, the acceleration changes are reduced, so that an operation of the deflecting device 15 is possible with minimal jolting and vibrations A further improvement of the operation of the deflecting device 50 can be achieved if several spiral paths 19 are provided in the hatched area 16, which will be explained hereinafter with reference to FIGS. 8 to 10.

Figure 8:
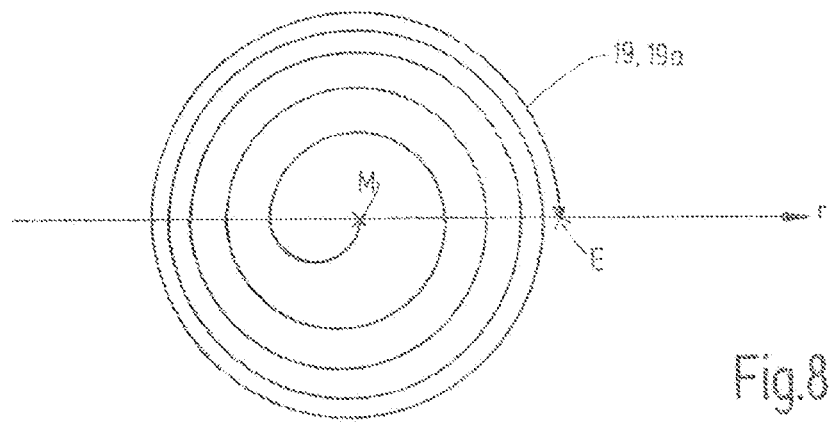
FIG. 8 a further exemplary embodiment of a first spiral path.

FIG. 8 shows a spiral path 19 that was determined according to the above-described principle. Hereinafter, this spiral path 19 acts as the first spiral path 19a. In the exemplary embodiment according to FIG. 9, the first spiral path 19a and a further, additional spiral path 19b are prespecified, these prespecifying the path of the point of impingement 18 of the laser in the hatched area. The two spiral paths 19a and 19b have the same spiral path parameters n, R, a. In accordance with the example, the second spiral path 19b is produced by mirroring the first spiral path 19a on the axis on which the transition points U between the semicircular segments 45, 46 of the first spiral path 19a are located. In the present case, the first mirroring occurs on the r-axis.

Figure 9:
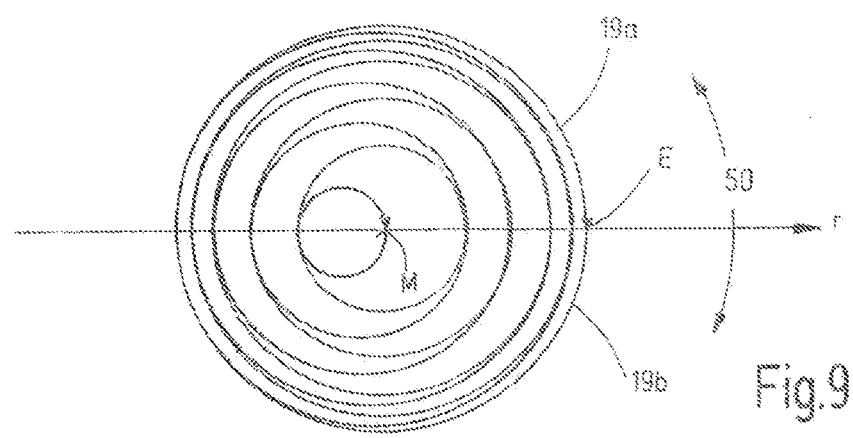
FIG. 9 the first spiral path according to FIG. 8, as well as an additional second spiral path determined with the use of the first spiral path, within the hatched area.

In the exemplary embodiment of the hatched area 16 having a first spiral path 19a and a second spiral path 19b according to FIG. 9, it is thus possible to guide the point of impingement 18 of the laser beam starting from the center point M to the end point E of the first spiral path 19a and from there, without directional reversal, back to the center point M by way of the second spiral path 19b. From there, the point of impingement 18 is then again guided along the first spiral path 19a in outward direction to the path end point E, etc. As a result of this, a smooth progression of movement for the setting movement of the deflecting mirrors 23, 24 by the servomotors 27 can be achieved.

Figure 10:
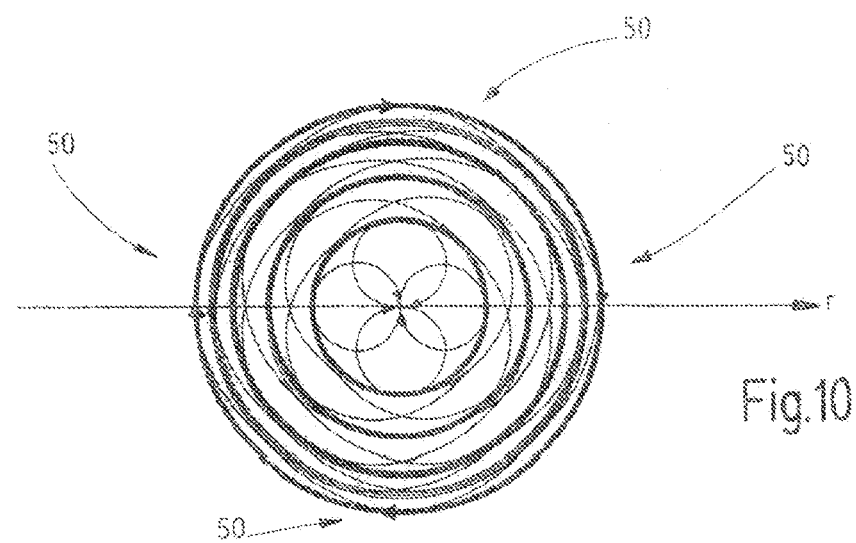
FIG. 10 four pairs each of a first and a second spiral path according to FIG. 9.

The first spiral path 19a and the second spiral path 19b according to FIG. 9 form a spiral path pair 50. As can be inferred from FIG. 9, considering this guiding of the laser, there exist points within the hatched area 16 with greater and points with lesser material ablation. For example, in FIG. 9 to the right of the center point M, there can be seen a region that is free of points of impingement 18. In order to achieve the homogenization of the material ablation within the hatched area 16 the laser beam may also be guided along a plurality of spiral paths 19 or several spiral paths 50. FIG. 10 shows one exemplary embodiment for this. In this case, the spiral path pair 50 according to FIG. 9 is arranged several times and, according to the example, four times within the hatched area 16. Each of the four spiral pairs 50 is rotated in circumferential direction about the hatched area 16 or the center point M, respectively inclined at 90° relative to each other. The spiral path pairs 50 are arranged uniformly in circumferential direction, as it were. The angle of rotation between two neighboring spiral pairs 50 results from the number of provided spiral path pairs 50. In modification of the exemplary embodiment according to FIG. 10, it is also possible to use an odd number of spiral path pairs. The number of spiral paths 19 or spiral path pairs 50 prespecified for guiding the laser beam within the hatched area 16 can basically be selected as desired. For example, it is also possible to provide six or twelve counter-rotated spiral path pairs 50.

Machining programs for certain repeating machining tasks can be stored in the control unit 14 and be selected by an operator via a not illustrated operator interface of the laser machining device 10. For example workpiece materials, the desired shapes of the ablation profile 40, cutting edge radii, surface roughnesses or the like can be selected in a machining program. The line spacing a and, optionally, additional spiral path parameters n, R, are then set by the control unit 14 as a function of the selected machining program. These spiral parameters a, n, R are allocated to the selectable machining program, for example in the form of a table or consistent with another comparable allocation rule. The machining programs provided for a machining task and the spiral path parameters necessary therefor can be determined empirically and then stored.

The invention relates to a method and a laser machining device 10 for machining a workpiece 13. The laser machining device 10 has a laser 11 for generating a laser beam 12, which is deflected by way of a deflecting device 15 in accordance with a pattern defined by a control unit 14 and is directed onto a workpiece surface 17 of a workpiece 13, which surface is to be machined. The point of impingement 18 of the deflected laser beam 12b on the workpiece surface 17 is guided along at least one spiral path within a circular hatched area 16. The spiral path 19 is characterized by spiral path parameters. One spiral path parameter is the line spacing a between neighboring points of intersection P of the spiral path 19 with an axis running through the center point M of the spiral path 19. The line spacing a can be variably adjusted or selected from prespecified values. By changing the line spacing a between two spiral path points located next to each other in radial direction with respect to the center point M, the energy distribution of the energy input by the laser beam within the hatched area 16 in the workpiece 13 can be adjusted within the hatched area 16. This is accomplished with a spacing parameter c of a prespecified or pre-specifiable spacing function f, by means of which the line spacing a can be determined. As a result of this, desired target parameters on the machined workpiece 13 can be influenced, for example, the surface roughness of a produced surface, in particular the cutting surface or flank surface, the edge radius of a cutting edge or the rate of material ablation during the machining operation.

12 Laser beam
12a Incident light beam
12b Deflected light beam
13 Workpiece
14 Control unit
15 Deflecting device
16 Hatched area
17 Workpiece surface
18 Point of impingement
19 Spiral path
19a First spiral path
19b Second spiral path
20 guide arrangement
23 First deflecting mirror
24 Second deflecting mirror
25 First mirror pivot axis
26 Second mirror pivot axis
27 Servomotor
29 Focusing device
30 Positioning assembly
31 Workpiece holder
32 First pivot drive
33 First pivot axis
34 Second pivot drive
35 Second pivot axis
36 second eccentric
40 Ablation profile
41 Flank
42 Base
45 First semicircular segment
50 Second spiral pair
a Line spacing
AS Deflecting signal
b Scaling factor
c Spacing parameter
D Diameter of the spiral path
E endpoint
f Spacing function
K Cams for activating the servomotors
LS Laser signal
LX, LY, LZ Linear drive
M Center point
n Number of spiral convolutions
P Point of intersection
PS Positioning signal
r Function variable
R Radius
t Time
U Point of transition
X, Y, Z Spatial direction

What is claimed is:

1. A method for machining a workpiece (13) with the use of a laser machining device (10), the laser machining device (10) including a laser (11) for generating a laser beam (12), an activatable deflecting device (15) arranged in the optical path of the laser beam (12), said deflecting device for deflecting the incident laser beam (12a) from the laser (11), while the workpiece is being machined, in at least two spatial directions (X, Y) and for directing the deflected laser beam (12b) onto a workpiece surface (17) of the workpiece (13), a positioning assembly (30) for positioning and/or moving the workpiece (13) and the deflecting device (15) relative to each other, said method comprising the following steps:

moving the workpiece (13) and the deflecting device (15) relative to each other for causing a pulse area (16) to move along the workpiece surface (17), by use of the positioning assembly (30), concurrently moving the point of impingement (18) of the deflected laser beam (12b) within the moving pulse area (16) on the workpiece surface (17) along at least one spiral path (19), by use of the deflecting device (15), describing the at least one spiral path (19) as at least one spiral path parameter (a, n, R), setting or selecting from prespecified data in order to influence the material ablation within the moving pulse area (16) one of the at least one spiral path parameter (a, n, R) as a line spacing (a) between two neighboring points of intersection (P) of the spiral path (19) having an axis (r) extending through the center point (M) of the spiral path (19), wherein the line spacing (a) can be set or selected as either increasing or decreasing as viewed from the center point (M) of the spiral path (19) in an outward direction, wherein a material ablation profile (40) of the workpiece (13) defined by the line spacing (a) corresponds to the cross-sectional profile of a produced groove.

2. The method of claim 1, characterized in that, as a second of the at least one spiral path parameter (a, n, R) describing the at least one spiral path (19), the radius (R) of the spiral path (19) is set or selected from prespecified data in order to influence the material ablation.

3. The method of claim 1, characterized in that, as a third of the at least one spiral path parameter (a, n, R) describing the at least one spiral path (19), the number (n) of spiral convolutions of the spiral path (19) within the moving pulse area (16) is set or selected from prespecified data in order to influence the material ablation within the moving pulse area (16).

4. The method of claim 1, characterized in that the line spacing (a)—viewed from the center point (M) of the at least one spiral path (19) in outward direction—can optionally be set or selected to be constant.

5. The method of claim 1, characterized in that the line spacing (a) is a function of a prespecified spacing function (f) that has at least one variable spacing parameter (c).

6. The method of claim 5, characterized in that the spacing parameter (c) is placed in the exponent of a function variable (r).

7. The method of claim 1, characterized in that, within the moving pulse area (16), there is prespecified at least one first spiral path (19*a*) extending from the center point (M) of the first spiral path (19*a*) in outward direction to a path end point (E), and that at least one second spiral path (19*b*) extending from the path end point (E) of the first spiral path (19*a*) back to the center point (M) of the first spiral path (19*a*) is prespecified, said second spiral path being different from the first spiral path (19*a*).

8. The method of claim 7, characterized in that the second spiral path (19*b*) comprises the same spiral path parameters (a, n, R) as the first spiral path (19*a*).

9. The method of claim 1, characterized in that the at least one spiral path (19) is composed of several semicircular segments (45, 46) having different radii.

10. The method of claim 1, characterized in that a movement of the moving pulse area (16) having the at least one spiral path (19) along the workpiece surface (17) generates a material ablation having an ablation profile (40) that is a function of the line spacing (a) of the spiral path (19).

11. The method of claim 1, characterized in that a movement of the moving pulse area (16) having the at least one spiral path (19) along the workpiece surface (17) generates a material ablation having the ablation profile (40), in which case the surface roughness on one flank (41) of the ablation profile (40) is a function of the line spacing (a) of the spiral path (19) in the radially outer marginal region of the moving pulse area (16).

12. The method of claim 1, characterized in that a movement of the moving pulse area (16) having the at least one spiral path (19) along the workpiece surface (17) generates a material ablation having the ablation profile (40), in which case the flank steepness of the ablation profile (40) is a function of the line spacing (a) of the spiral path (19) in the radially outer marginal region of the moving pulse area 16.

13. The method of claim 1, characterized in that several selectable machining programs are stored in memory, in which case each machining program is at least allocated the line spacing (a) or additional further spiral path parameters (n, R).

14. The method of claim 1, characterized in that several selectable machining programs are stored in memory, and are available for different ablation profiles (40) on the workpiece (13).

15. Laser machining device (10) for machining a workpiece (13), the laser machining device (10) comprising,
a laser (11) for generating a laser beam (12),
a deflecting device (15) that is arranged in the optical path of the laser beam (12) and that can be activated by a control unit (14), said deflecting device deflecting the incident laser beam (12*a*) from the laser (11) while the workpiece is being machined in at least two spatial directions (X, Y) and directing the deflected laser beam (12*b*) onto the workpiece (13),
a positioning assembly (30) for positioning and/or moving the workpiece (13) and the deflecting device (15) relative to each other for causing a pulse area (16) to move along the workpiece surface (17),
the control unit (14) for activating the deflecting device (15) in such a manner that the point of impingement (18) of the deflected laser beam (12*b*) moves within the moving pulse area (16) on the workpiece surface area (17) along at least one spiral path (19),
the control unit (14) for utilizing at least one spiral path parameter (a, n, R) for describing the at least one spiral path (19),
the control unit (14) for setting or selecting from prespecified data in order to influence the material ablation within the moving pulse area (16) the line spacing (a) between two neighboring points of intersection (P) of the spiral path (19) having an axis (r) extending through center point (M) of the spiral path (19)) wherein the line spacing (a) can be set or selected as either increasing or decreasing as viewed from the center point (M) of the spiral path (19) in an outward direction, wherein a material ablation profile (40) of the workpiece (13) defined by the line spacing (a) corresponds to the cross-sectional profile of a produced groove.

\* \* \* \* \*